United States Patent [19]

Takahashi

[11] Patent Number: 5,537,677
[45] Date of Patent: Jul. 16, 1996

[54] RADIO RECEIVER FITTED WITH TELESCOPE

[75] Inventor: Nobuyuki Takahashi, Tokyo, Japan

[73] Assignee: Sony Corporation, Tokyo, Japan

[21] Appl. No.: 305,281

[22] Filed: Sep. 12, 1994

[30]  Foreign Application Priority Data

Sep. 20, 1993 [JP]  Japan ................................. 5-256487

[51] Int. Cl.$^6$ ....................................................... H04B 1/06
[52] U.S. Cl. ........................ 455/344; 455/351; 359/399; 359/809
[58] Field of Search .................. D16/132, 133; D14/168; 359/808, 809, 819, 895, 409, 419, 399; 350/429; 455/89, 90, 344, 347, 348, 350, 351; 361/816, 818; 174/52, 50

[56]  References Cited

U.S. PATENT DOCUMENTS

| | | | |
|---|---|---|---|
| D. 206,462 | 12/1966 | Petrusek | D14/168 |
| D. 332,792 | 1/1993 | Jörlöv | D16/132 |
| 3,761,815 | 9/1973 | Bower | 455/89 |
| 4,035,731 | 7/1977 | Dixon | 455/351 |
| 4,083,011 | 4/1978 | Ferrell et al. | 458/351 |
| 4,313,025 | 1/1982 | Grube, Jr. | 174/50 |
| 4,582,350 | 4/1986 | Okajima | 350/429 |
| 4,651,312 | 3/1987 | Honma et al. | 455/351 |
| 4,856,086 | 8/1989 | McCullough | 455/351 |

FOREIGN PATENT DOCUMENTS 56-39634  4/1981  Japan ..................................... 455/351

OTHER PUBLICATIONS

Popular Photography, Dec. 1990.

*Primary Examiner*—Andrew I. Faile
*Attorney, Agent, or Firm*—Ronald P. Kananen

[57]  ABSTRACT

A telescope-radio receiver assembly, in which a telescope and a radio receiver are built into a single casing, includes a casing made up of an upper half and a lower half as a substantially parallelepipedic hollow member. The casing is formed with a first housing section for housing a telescope section extending along its first lateral surface across two mutually opposite lateral surfaces extending at right angles to the first lateral surface, and a second housing section for housing a radio receiving section fitted with a bar antenna. The second housing unit is extended outward beyond a front side one of the two mutually opposite lateral surfaces extending at right angles to the first lateral surface. The radio receiving section has its bar antenna housed along the front side lateral surface extended beyond the second housing section for achieving good reception sensitivity without being affected by the telescope disposed within the casing. The telescope unit has its lens barrel formed of a synthetic material mixed with glass fibers for assuring mechanical strength and light weight.

7 Claims, 12 Drawing Sheets

RADIO RECEIVER FITTED WITH TELESCOPE

BACKGROUND OF THE INVENTION

1. Field of the Invention

This invention relates to a radio receiver with a built-in telescope.

2. Description of the Related Art

Some watchers of a sport game or a horse race often use a telescope as they listen to on-the-spot broadcast from a radio broadcasting station. It is however highly cumbersome to carry both the telescope and the radio receiver to the sports arena or a racecourse. Since it is necessary to focus the telescope and to tune in the radio receiver simultaneously, one may fail to view or hear a critical scene. In addition, one may fail to grasp a fairly large number of articles and allow them to drop on the ground or floor. Thus there exists a demand for telescope-radio receiver assembly in which a telescope and a radio receiver are unified into an integral unit.

In a telescope, since distortion in a lens barrel fitted with a lens leads to problems such as warped image or moire pattern, telescope components including the lens barrel are fabricated with sufficient mechanical strength and precision by metal die-casting. Thus the conventional telescope tends to be increased in weight.

On the other hand, portable radio receivers are generally classed into two-band type receivers capable of receiving FM broadcast and AM broadcast, and three-band type receivers capable of receiving FM broadcast, AM broadcast and short-wave broadcast. For clear reception of electrical waves for each such broadcast, an antenna is required, while an earphone cord is simultaneously employed as an antenna for receiving the FM broadcast. As an AM broadcast reception antenna, an extensible rod antenna or an enclosed type ferrite bar antenna is employed. In a portable pocket-sized radio receiver, a ferrite bar antenna is in widespread use because it does not catch the apparel and moreover is unprotrusive.

Such ferrite bar antenna has a high directivity, while its reception sensitivity is significantly lowered if the path along which the electrical waves reach the antenna is obstructed by an electrically conductive member, such as a metal member. Thus, sufficient attention needs to be exercised as to the disposition of the ferrite bar antenna in designing a radio receiver.

Since the portable radio receiver and the telescope have the above-described characteristics, if these are simply combined into a sole telescope-radio receiver device, it is increased in size and weight and difficult to use as a portable type device. Since the radio receiver has only poor reception sensitivity, the device may hardly be put to practical application. Above all, the lens barrel fabricated by metal diecasting has a dual barrier wall, that is inner and outer barrier walls, with respect to the ferrite bar antenna, so that it deteriorates reception sensitivity significantly.

OBJECTS AND SUMMARY OF THE INVENTION

It is therefore an object of the present invention to provide a telescope-radio receiver assembly, that is a novel radio receiver having a built-in telescope therein.

It is another object of the present invention to provide a telescope-radio receiver assembly which is small-sized, lightweight and which has highly satisfactory radio broadcast reception sensitivity.

The present invention provides a telescope-radio receiver assembly comprising a casing made up of an upper half and a lower half as a substantially parallelepipedic hollow member. The casing is formed with a first housing section for extending along a first lateral surface thereof across two mutually opposite lateral surfaces extending at right angles to the first lateral surface, and a telescope unit housed within the first housing unit. The telescope unit having a lens barrel formed of a synthetic material mixed with glass fibers for reducing the overall weight.

The casing has a further housing section isolated from the first housing section and a radio receiving section fitted with a bar antenna is housed within the further housing section.

The casing has a further housing section isolated from the first housing section and a radio receiving section fitted with a bar antenna is housed within the further housing section. The bar antenna is arranged along one of the two mutually opposite lateral surfaces on which an objective lens of the telescope section is arrayed.

The casing is made up of an upper half and a lower half as a substantially parallelepipedic hollow member. The casing is formed with a first housing section and a second housing section. The first housing section extends along a first lateral surface thereof across two mutually opposite lateral surfaces extending at right angles to the first lateral surface. The second housing section is formed for extending outward beyond the front one of the two lateral surfaces. The bar antenna is housed within the second housing section for extending along the front side lateral surface protruded beyond the second housing section.

The second housing section has a projecting portion formed by projecting the front side one of the two mutually opposite lateral surfaces beyond an objective lens of the telescope section, and the bar antenna is disposed within the projecting portion for assuring reception of radio broadcast without interference from the telescope.

Heat insulating means is provided between the first and second housing sections in order to prevent heat generated by the radio receiving section from being transmitted from the radio receiving section.

The telescope-radio receiver assembly is also provided with a rotation stop mechanism for inhibiting rotation of the telescope section housed within the first housing section.

The telescope-radio receiver assembly is also provided with an earphone fed with output signals of the radio receiving section and a takeup section for taking up an earphone cord for the earphone.

Other objects and advantages will become apparent from the following description of the preferred embodiment and the claims.

DETAILED DESCRIPTION OF THE PREFERRED EMBODIMENT

Figure 1:
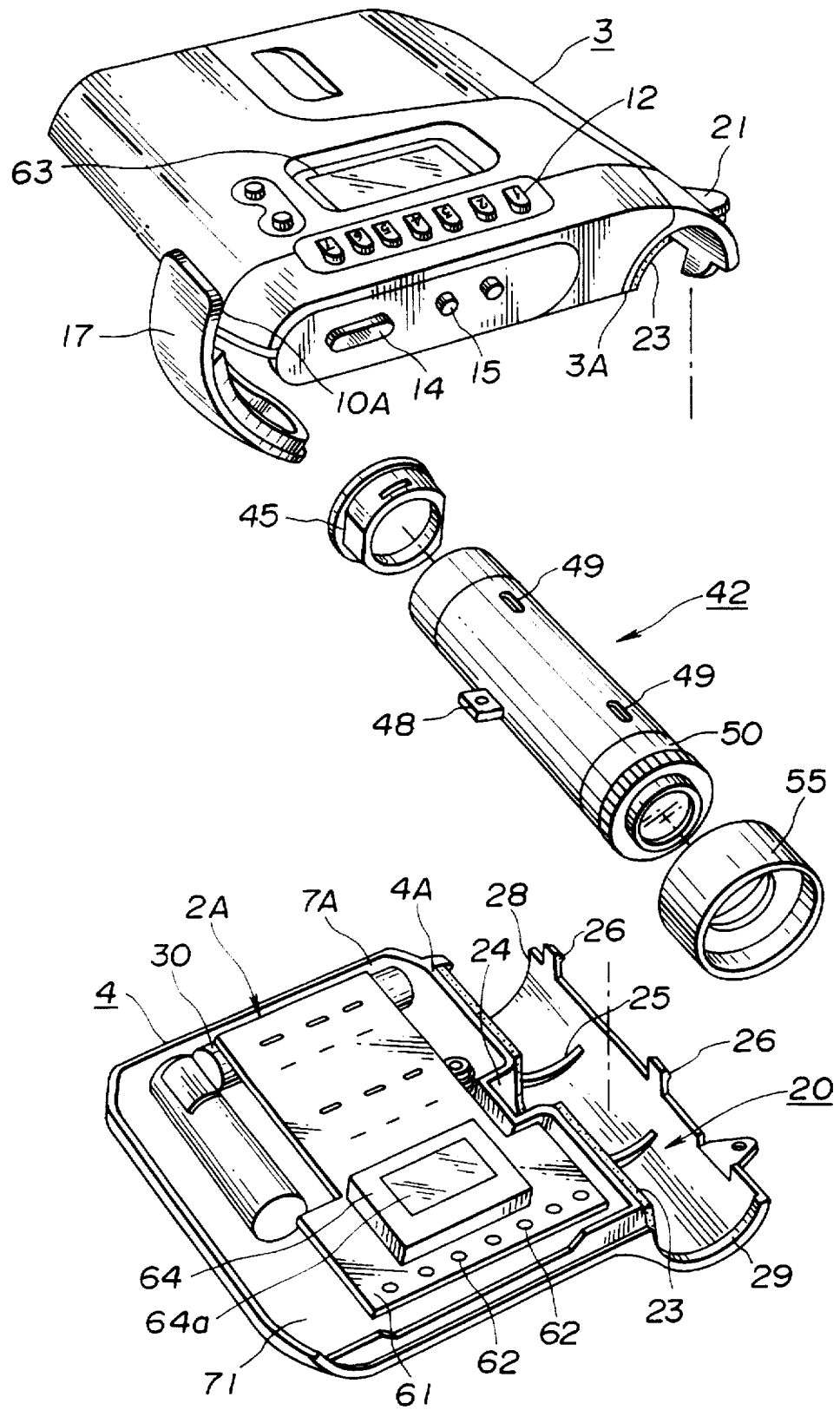
FIG. 1 is an exploded perspective view of the telescope-radio receiver assembly according to the present invention.

Referring to the drawings, a preferred embodiment of the present invention will be explained in detail.

There is shown in the drawings a telescope-radio receiver assembly according to a preferred embodiment of the present invention in which a monocular telescope 42 is built in a radio receiver. The telescope-radio receiver assembly is comprised of a substantially flat box-shaped casing 2 formed by combining an upper half 3 and a lower half 4 molded from synthetic material, by abutting them to each other, as shown in FIG. 1.

Figure 2:
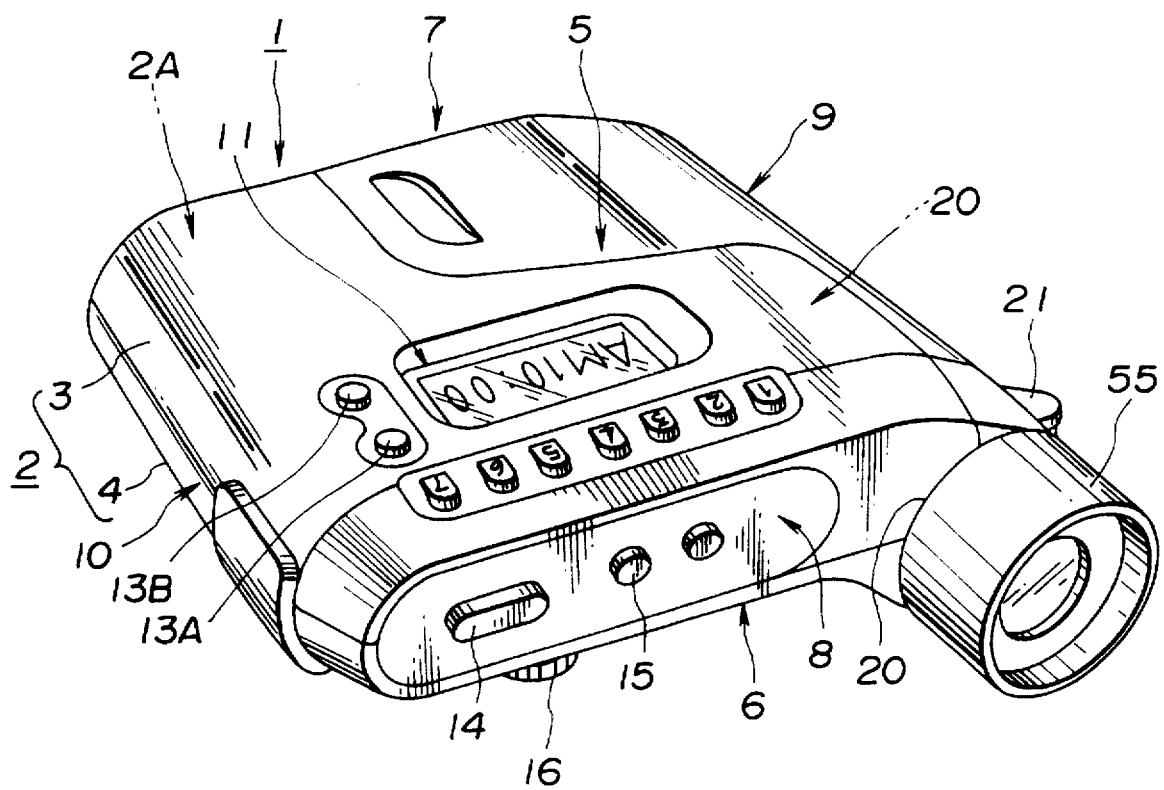
FIG. 2 is a perspective view of the telescope-radio receiver assembly according to the present invention.

The interior of the casing 2 is partitioned into a radio receiver housing section 71 for housing a radio receiving unit 2A having various components making up a radio receiving unit and a telescope loading section 20 defining a telescope holding space for holding the monocular telescope 42. In the following description, various surfaces of the telescope-radio receiver assembly, that is an upper major surface, a lower major surface, a front lateral surface, a rear lateral surface, a right lateral surface and a left lateral surface, are denoted by reference numerals 5, 6, 7, 8, 9, and 10, with the position of the telescope shown in FIG. 2 as a reference position.

Figure 3:
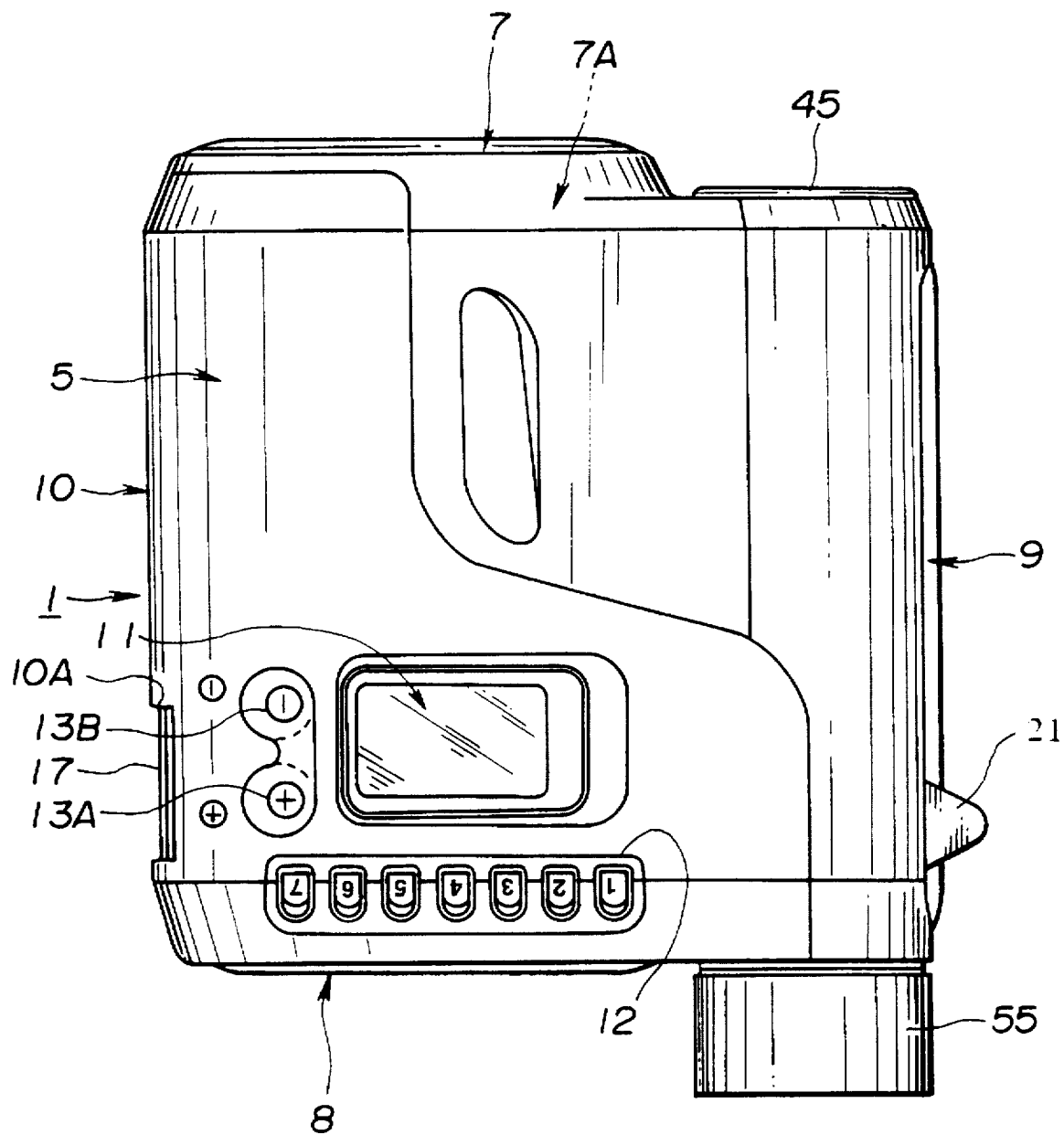
FIG. 3 is a plan view of the telescope-radio receiver assembly according to the present invention.

On the upper major surface 5 of the casing 2 are arranged a transversely arranged rectangular digital display section 11, plural one-touch tuner buttons 12 and a pair of time correcting buttons, namely a plus correcting button 13A and a minus correcting button 13B, as shown in FIG. 3. On the digital display section 11, the current time is displayed and, if one of the tuner buttons 12 is pressed, the frequency as set on the one-touch tuner button is briefly displayed in exchange for the current time for a pre-set time. If the plus correction button 13A or the minus correction button 13B is pressed, the number indicated on the digital display section 11 is corrected in the plus and minus directions, respectively.

Within the casing 2, a printed circuit board 61 constituting an electronic circuit constituting in turn a radio receiver is arranged as shown in FIG. 1. On the printed circuit board 61, plural switches 62 actuated by these one-touch buttons 12 are arranged facing the one-touch tuner buttons 12 so as to be actuated by these one-touch tuner buttons 12. On the printed circuit board 61, a display element 64 comprised of a liquid crystal element constituting the digital display section 11 is mounted facing a window 63 formed in the upper half 3 constituting the casing 2, as shown in FIG. 1.

Figure 5:
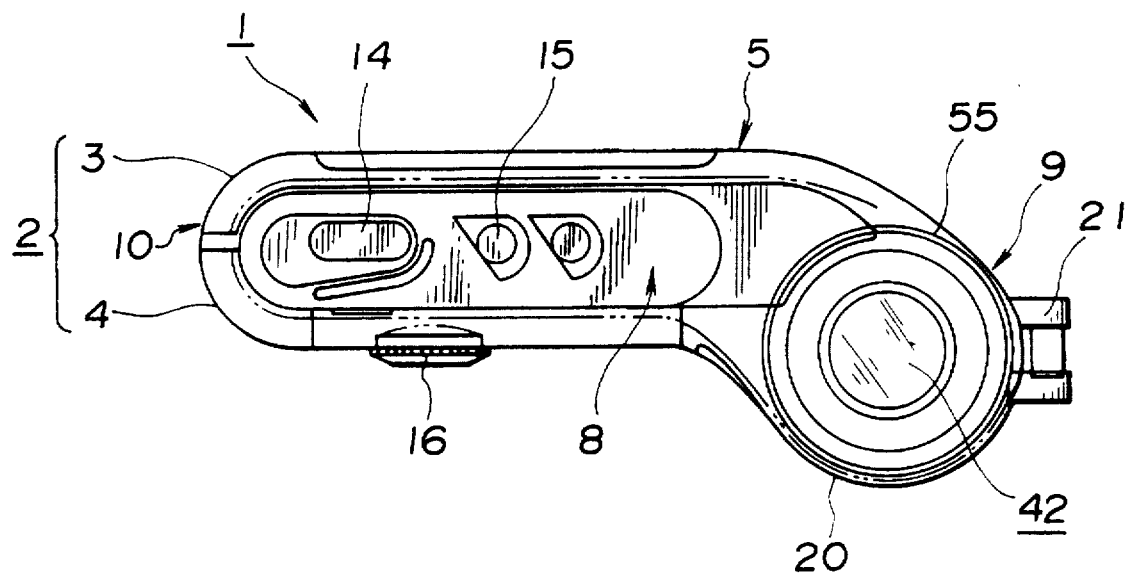
FIG. 5 is a front view of the telescope-radio receiver assembly according to the present invention.

On the rear lateral surface 8, or a longitudinal lateral side, of the casing 2, a power source button 14 and a band-setting button 15 for changing over the frequency band between the AM broadcast and FM broadcast are arranged, as shown in FIG. 5. In addition, the rear lateral surface 8 is faced by an eye-piece unit 50 of the monocular telescope 42 loaded in the telescope loading section 20 formed along the right lateral surface 9, as will be explained subsequently.

Figure 4:
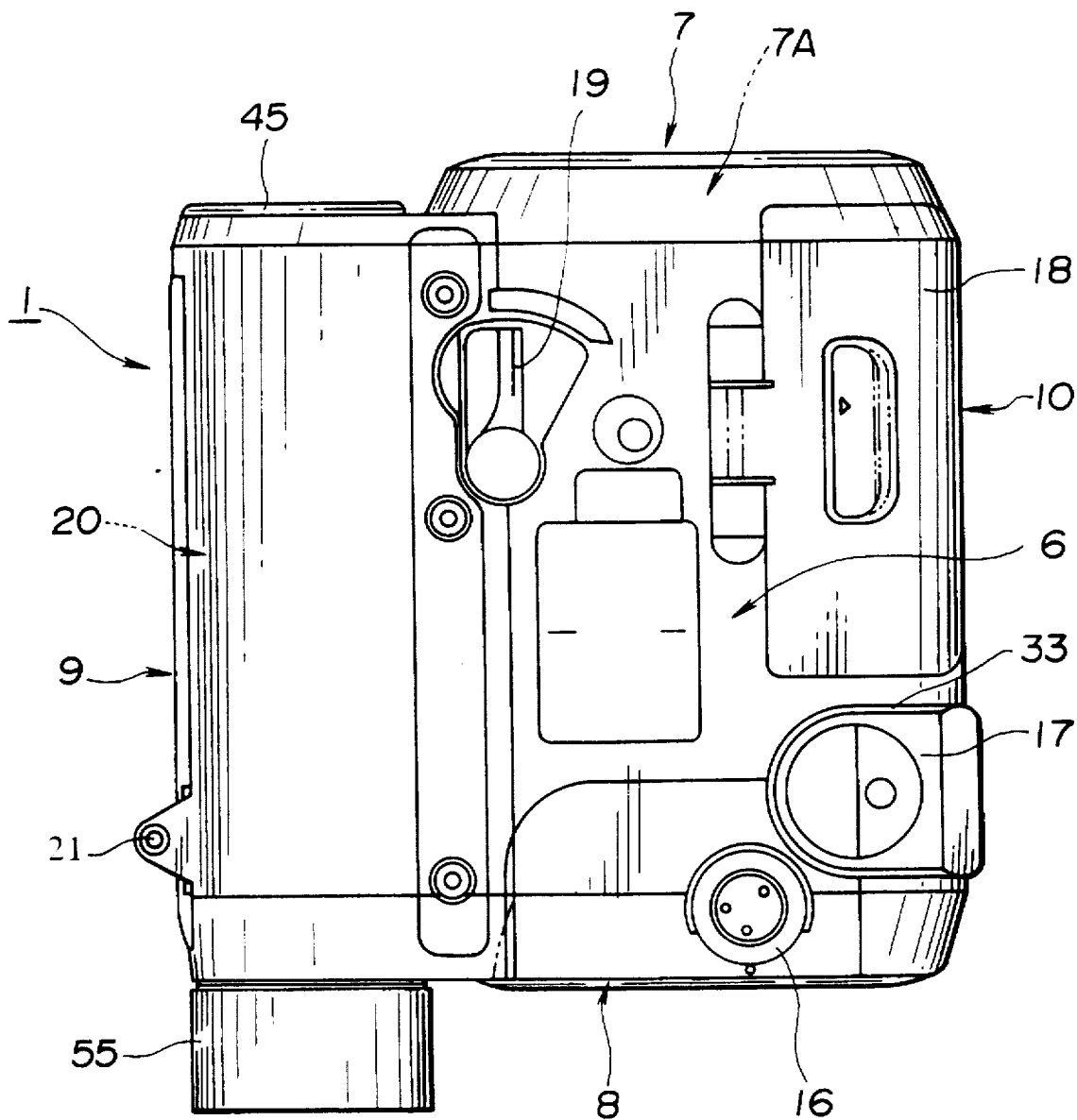
FIG. 4 is a bottom view of the telescope-radio receiver assembly according to the present invention.

On the lower major surface 6 of the casing 2, a volume dial 16 is mounted so that its peripheral surface is partially protruded towards the rear lateral surface 8, while a lid member and a battery lid 18 are arranged towards the left lateral surface 10 constituting a widthwise lateral surface of the casing 2, as shown in FIG. 4. The lid member 17 and the battery lid 18 are arranged for opening and closing an earphone holding recess 33 as later explained and a battery holding section, respectively. An earphone cord takeup lever 19 for driving an earphone cord takeup device is arranged in a boundary region contiguous to the telescope loading section 20.

Figure 6:
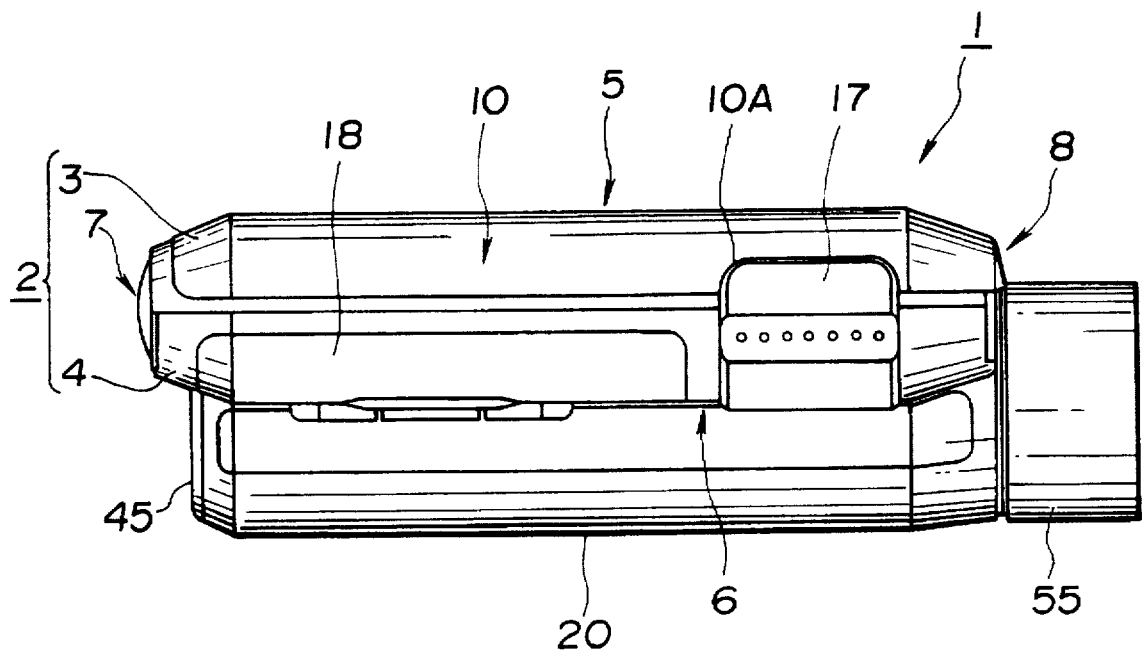
FIG. 6 is a left-hand side view of the telescope-radio receiver assembly according to the present invention.
Figure 7:
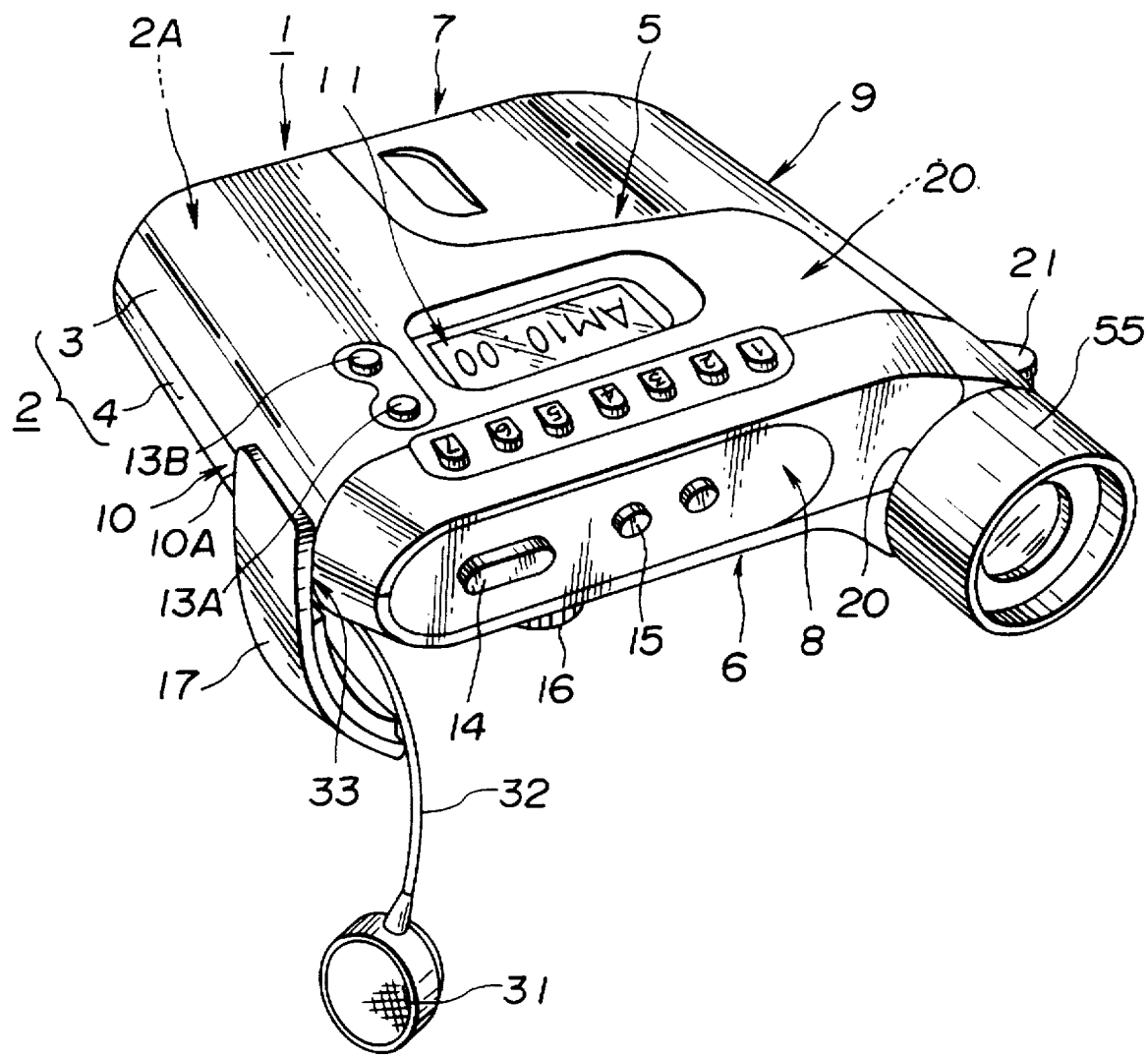
FIG. 7 is a perspective view of the telescope-radio receiver assembly, shown with an earphone in the drawn-out state.
Figure 8:
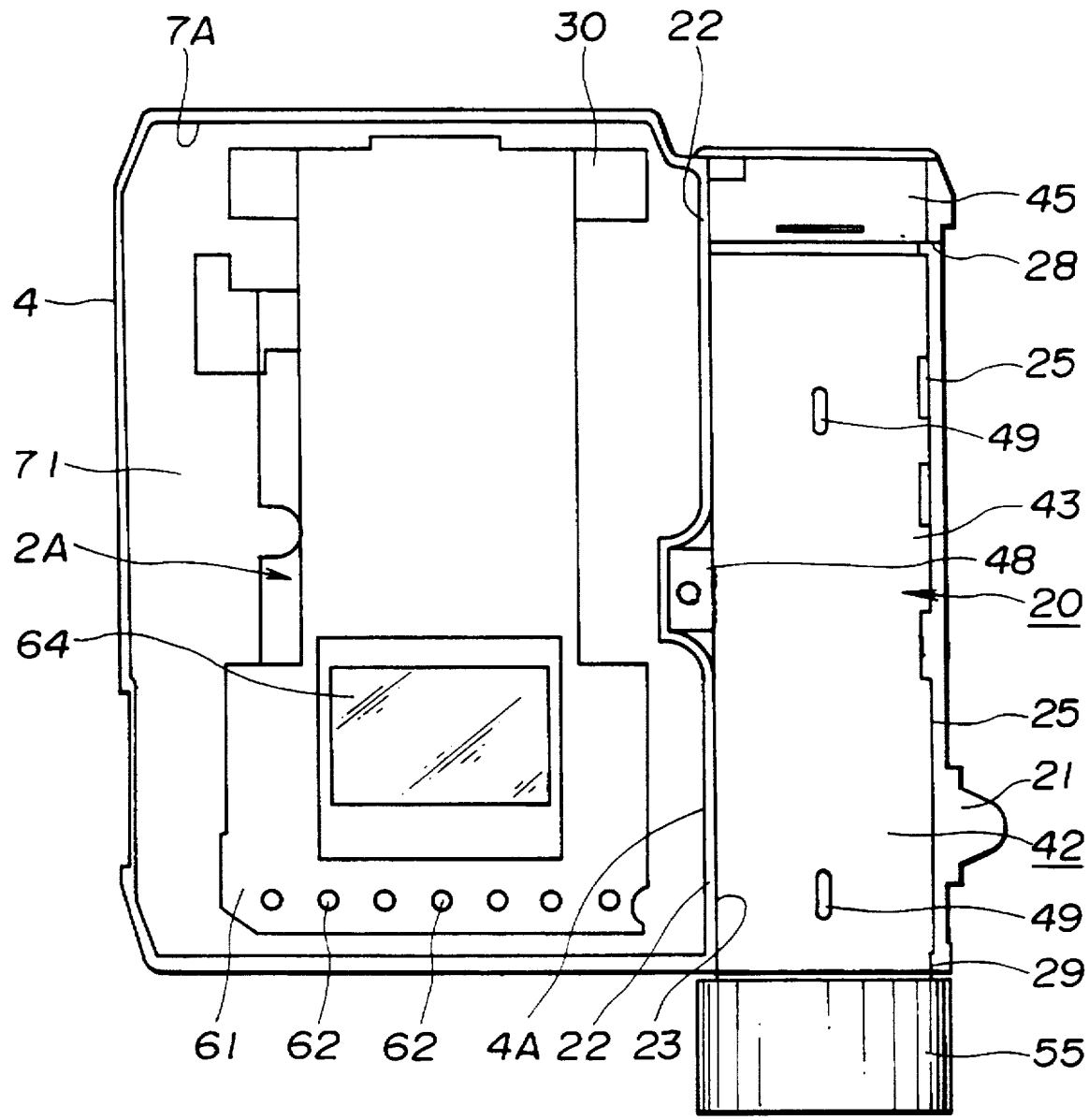
FIG. 8 is a plan view of the telescope-radio receiver assembly, shown with an upper half removed.

The right lateral surface 9 of the casing 2, sloped gradually towards right, constitutes the telescope loading section 20 defining a tubular space by the semicircular upper half 3 and the semicircular lower half 4 abutted against each other, as shown in FIG. 1. A lug 21 having an eye-hole for passage of a string, not shown, is formed on the right lateral surface 9. In the left lateral surface 10 of the casing 2 is formed a lid member holding recess 10A in which to hold an attachment section 35 of the lid member 17 extended from the lower major surface 6 towards the rear lateral surface 8, while a substantially L-shaped lateral surface of the battery lid 18 is extended from the lower major surface 6 so as to be flush with the left lateral surface 10, as shown in FIG. 6.

The front lateral surface 7 of the casing 2 is faced by an opening of an objective lens cap 45 constituting an objective lens section of the monocular telescope 20 fitted on the telescope loading section 20, while a portion of the radio receiving unit 2A is formed so as to be slightly extended forwards relative to the telescope loading section 20, as shown in FIG. 3.

The detailed construction of the telescope-radio receiver assembly 1 according to the present embodiment is now explained. The telescope loading section 20 formed along the right lateral side 9 of the casing 2 is separated from the radio receiving unit 2A by a partitioning wall 22 formed by abutting arcuate protuberant walls 3A, 4A formed on the upper and lower halves 3, 4, respectively. The telescope loading section is formed as a cylindrical void space opened at the rear lateral surface 8 and the front lateral surface 7, as described previously.

Figure 10:
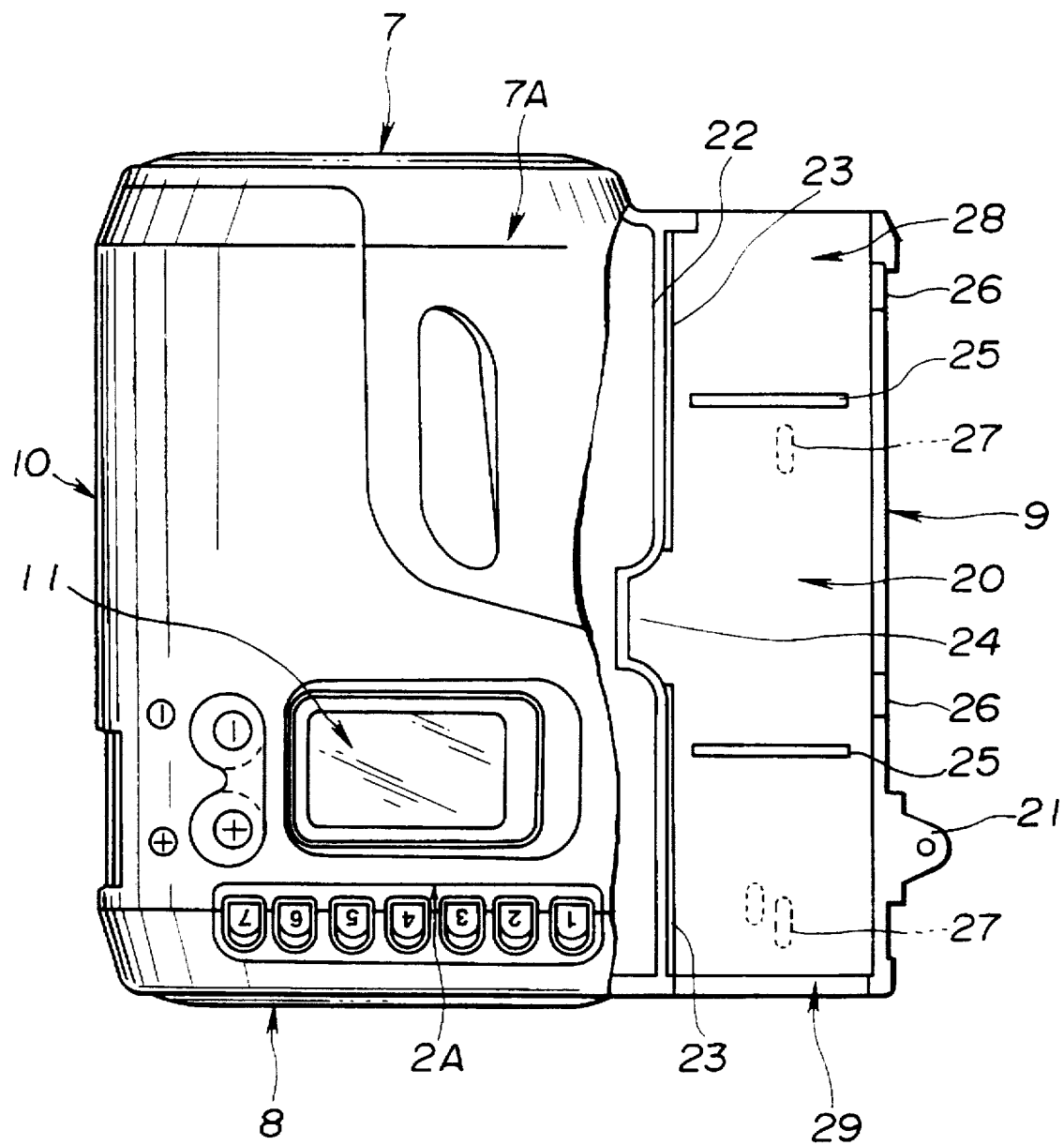
FIG. 10 is a plan view showing a lower half constituting the telescope-radio receiver assembly according to the present invention.
Figure 11:
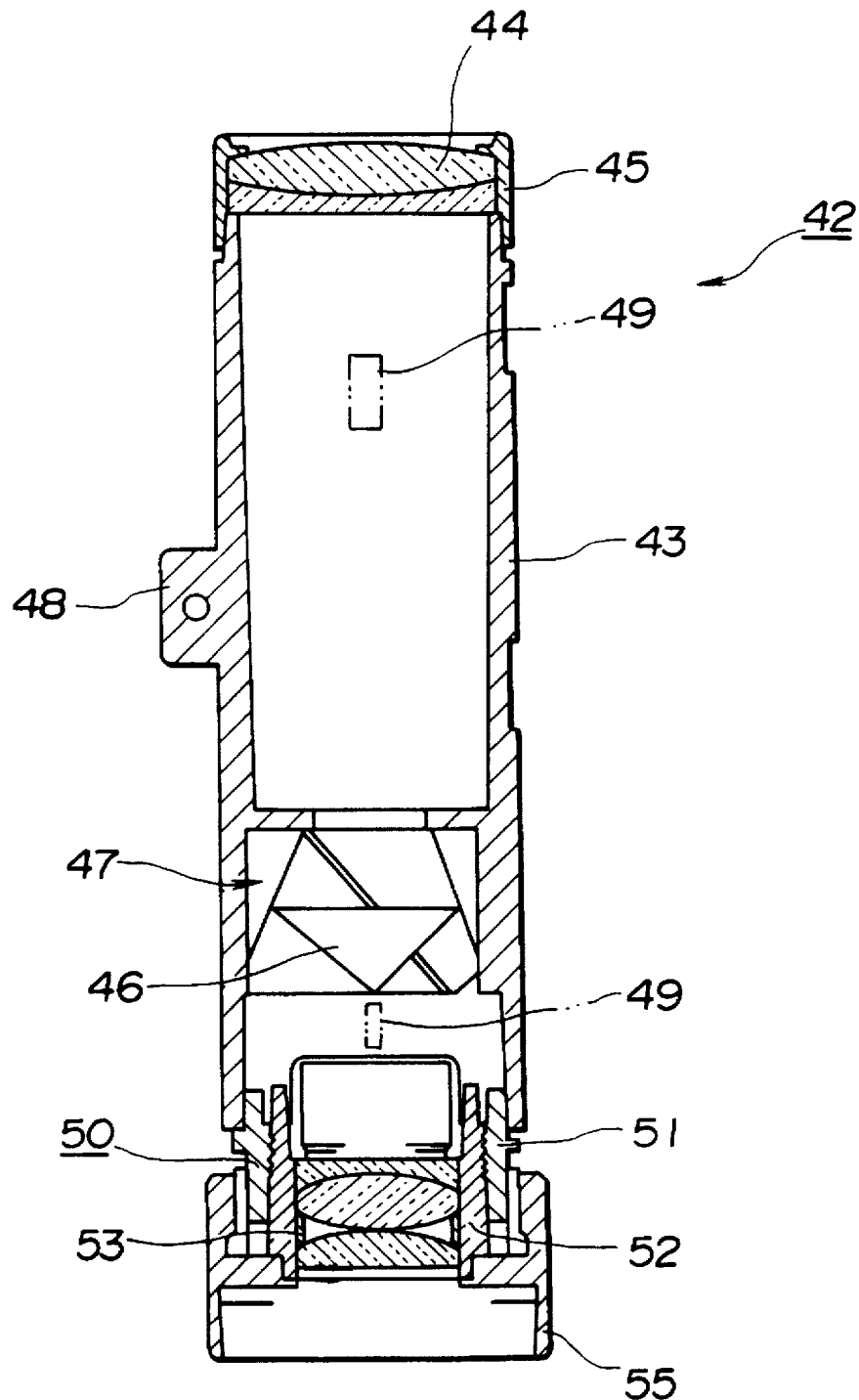
FIG. 11 is a longitudinal cross-sectional view of a monocular telescope built into the telescope-radio receiver assembly according to the present invention.

The inner lateral surface of the partitioning wall 22 contiguous to the telescope loading section 20 is coated with silicon resin over the entire widthwise extent of the casing 2 for forming a heat insulating layer 23, in order to protect the monocular telescope 42 against heat generated from the electrical and electronic components of he radio receiving unit 2A, as shown in FIG. 10. The heat insulating layer 23 for thermal insulation between the radio receiving unit 2A and the telescope loading section 20 may be replaced by an interposed heat-insulating sheet, not shown.

The partitioning wall 22 constituting the telescope loading section 20 is formed with a telescope mounting section 24 which has a tapped hole and which is extended towards the radio receiving unit 2A. The inner surface of the lower half 4 constituting the telescope loading section 20 is formed with a pair of arcuate ribs 25, spaced apart from each other in the fore-and-aft direction, for supporting the monocular telescope 42 in a stable state, and with a guide rib 26, as shown in FIG. 1.

The inner surface of the upper half 4 constituting the telescope loading section 20 is formed with a pair of axially extending rotation stop members 27, spaced apart from each other in the fore-and-aft direction, as indicated by an imaginary line in FIG. 10. An objective lens attachment section 28 and an eyepiece lens cap attachment section 29 are formed on the forward opening and rear opening sides of the telescope loading section 20, respectively.

Figure 9:
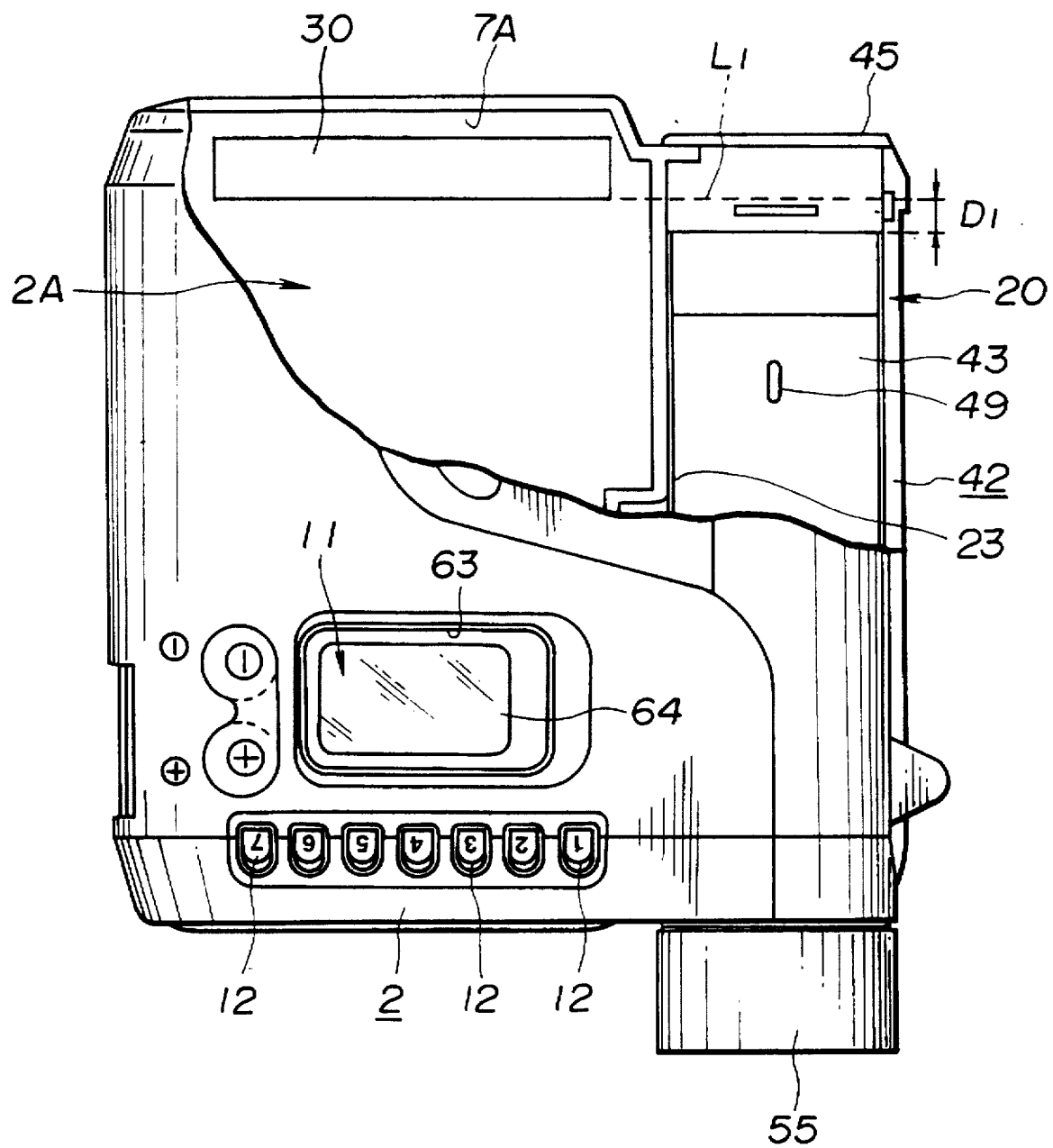
FIG. 9 is a plan view of the telescope-radio receiver assembly according to the present invention, with a portion thereof being removed.

Within a bar antenna holding section 7A, delimited within the forward lateral section 7, protruded forwards from the telescope loading section 20, there is mounted a ferrite bar antenna 30 for extending along the forward lateral section 7 for receiving the AM broadcast band for extending in a direction intersecting the telescope loading section 20, as shown in FIG. 9. The telescope-radio receiver assembly 1 according to the present invention is capable of receiving FM broadcast as well. An earphone cord 32, explained subsequently, is simultaneously employed as the antenna for receiving the FM broadcast band.

Thus the telescope-radio receiver assembly is so designed that the body member of the monocular telescope 42 loaded in the telescope loading unit 20 is not positioned on the axis $L_1$ of the ferrite bar antenna 30, as shown in FIG. 9. That is, the axis $L_1$ is positioned a distance of D ahead of an objective lens set 44 provided on the distal end of the monocular telescope 42. Thus the bar antenna 30, which is arranged within the bar antenna holding section 7A provided towards the forward lateral section 7, and which exhibits directivity along the axis $L_1$, is safeguarded against effects of the hand holding the telescope-radio receiver assembly 1 or of the monocular telescope 42 loaded in the telescope loading section 20, and thus exhibits good reception sensitivity.

With the telescope-radio receiver assembly 1 according to the present embodiment, AM or FM broadcast is heard using an earphone 31 connected to the earphone cord 32. When not in use, the earphone 31 is held in the earphone holding recess 33 formed in the lower major surface 6 of the casing 2 closed by the lid member 17. The earphone cord 32 is adapted to be automatically housed within the casing 2 by an earphone cord takeup device, not shown, provided within the casing 2.

As the earphone cord takeup device, a device having a construction similar to a takeup device for an earphone cord in the earphone holding unit as described in, for example, JP Patent Publication No. 5-34840 (1993), may be employed. The earphone cord takeup device, not shown herein, includes an earphone housing section, a cord takeup reel biased by a helical spring in the earphone cord takeup direction, rotatable cord connection terminals, constituted by a concentric cord connecting terminal, centered about the rotary shaft of the cord takeup reel, and by a pressure contact terminal contacted with the concentric terminal, a retention pawl formed on the cord takeup reel, and a releasable retention plate biased in a direction of being engaged with the retention pawl.

With the above-described earphone cord takeup unit, the earphone cord 32 is pulled out a desired length from the earphone housing section 33 by strongly pulling the earphone 31, while taking up the helical spring acting on the cord takeup reel. The earphone cord 32 thus pulled out may be taken up by acting on the earphone cord takeup lever 19 for disengaging the retention plate from the retention pawl for rotating the cord takeup reel in the restoring direction under the bias of the helical spring.

Figure 14:
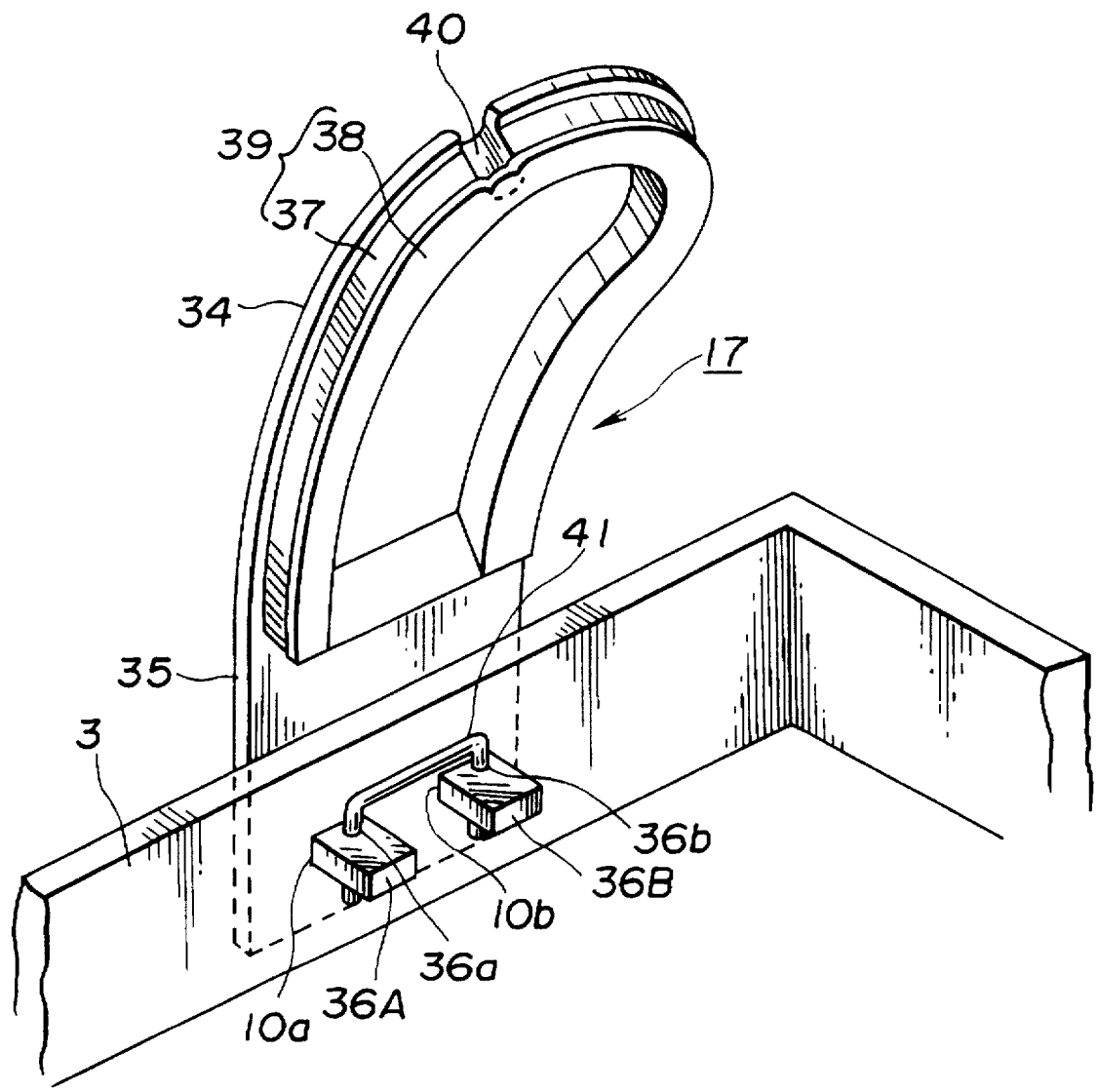
FIG. 14 is a schematic perspective view for illustrating a lid for opening and closing the earphone holding recess and the lid mounting state.

Referring to FIG. 14, the lid member 17 is substantially tongue-shaped in its entirety and is formed of an elastic material, such as elastomer or rubber. The lid member is comprised of a closure portion 34 for closing the earphone holding recess 33 formed in the lower major surface 33, a mounting portion 35 extended towards the left lateral surface 10 of the casing 2 so as to be contained in the lid holding recess 10A and a pair of mounting projections 36A, 36B formed on the inner surface of the mounting portion 35 at a widthwise distance from each other.

On the inner surface of the outer periphery of the closure portion 34 of the lid member 17 is formed a thin-walled upstanding wall 37, the distal end of which is provided with a thin-walled flange 38 facing the outer periphery of the closure portion 34, thereby forming a fitting portion 39 having an increased thickness. The fitting portion 39 is substantially similar in shape to the opening of the earphone holding recess 33. An earphone cord extraction groove 40 is formed in the outer peripheral surface of the upstanding wall 37 and the outer edge of the closure portion 34, as shown in FIG. 14. Such earphone cord extraction groove 40 is not formed in the flange 38. Thus the earphone cord extraction groove is formed with a thin-walled bottom by the flange 38.

The mounting projections 38A, 38B formed on the mounting portion 35 of the lid member 17 are in the form of blocks provided with fitting through-holes 36a, 36b extending along the height. These mounting projections 36A, 36B are fitted into mounting holes 10a, 10b formed in the left lateral surface 10 of the casing 2. With the mounting projections 36A, 36B introduced into the mounting holes 10a, 10b for facing the inside of the casing 2, a U-shaped anti-withdrawal pin 41 is introduced into the fitting through-holes 36a, 36b. This causes the lid member 17 to be extended around the lower major surface 6 of the casing 2 in order to support the lid member in a cantilever fashion by the left lateral surface 10 of the casing 2.

The outer dimension of the mounting projections 36A, 36B is selected to be slightly larger than the opening size of the mounting holes 10a, 10b. Thus the mounting projections are fitted tightly in the mounting holes 10a, 10b under the effect of resilient deformation. This prevents rain waterdrops or the like from being intruded via the mounting portion of the lid member 17.

Figure 12:
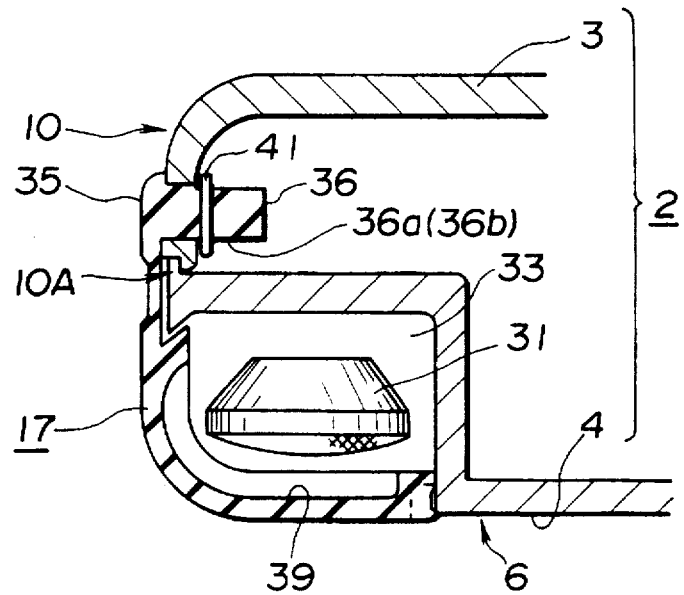
FIG. 12 is a schematic longitudinal cross-sectional view for illustrating an earphone holding recess.

With the above-described lid member 17, the fitting portion 39 is fitted in the earphone holding recess 33. The flange 38 of the fitting portion 39 in the form of a thin membrane is elastically deformed in this manner so as to be tightly contacted with the inner peripheral wall of the opening of the earphone holding recess 33 for preventing rain waterdrops or the like from being intruded into the earphone holding recess 33, as shown in FIG. 12. The operation of inhibiting intrusion of waterdrops into the earphone holding recess 33 by the lid member 17 is maintained after extracting the earphone 31 from the earphone holding recess 33.

Figure 13:
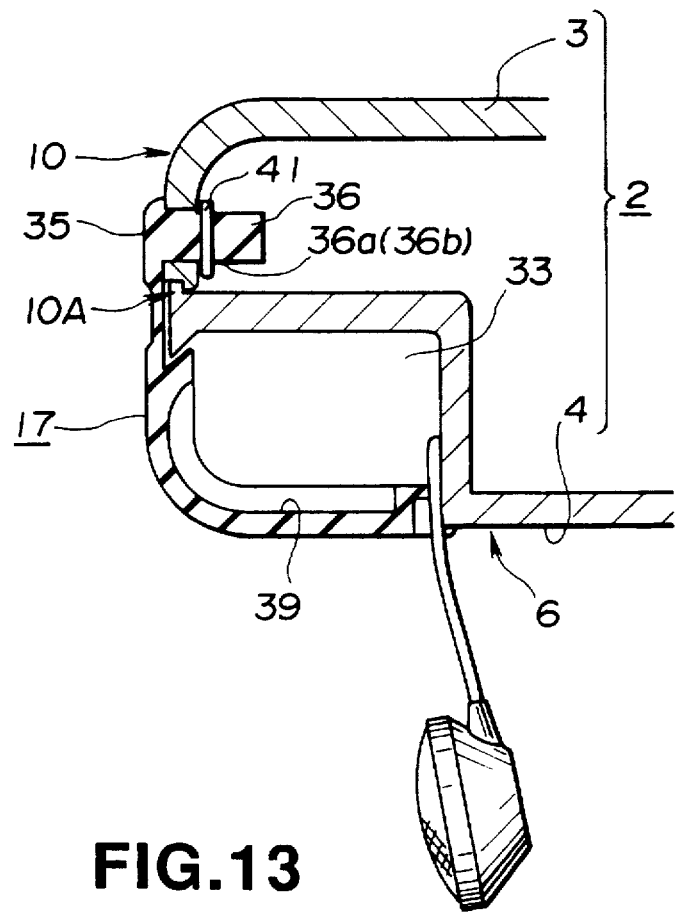
FIG. 13 is a schematic longitudinal cross-sectional view for illustrating the state in which an earphone is pulled out from the earphone holding recess.

With the earphone 31 pulled outward, the fitting portion 39 of the lid member 17 is fitted in the earphone holding recess 33. The earphone cord 32 is pulled out at this time from the earphone holding recess 33 along the earphone extraction groove 40, as shown in FIG. 13. The flange 38 in the form of a thin membrane, constituting the bottom wall of the earphone extracting groove 40, is tightly contacted with the peripheral surface of the earphone 32 for preventing rain waterdrops or the like from being intruded into the earphone holding recess 33.

The monocular telescope 42, loaded in the telescope loading section, has a tube barrel 43 constituted by a synthetic material mixed with glass fibers for maintaining its mechanical strength, such as ABS resin or polycarbonate rein. An objective lens cap 45, molded of a hard synthetic material, is fitted on the forward portion of the tube barrel 43 fitted with the objective lens unit 44, while a prism unit 47 having a prism 46 therein is built in the inside of the tube barrel 43.

A mounting lug 48 having a through-hole is formed on the peripheral surface of the tube barrel 43 in register with the telescope mounting portion 24 provided in the partitioning wall 22 provided between the radio receiving section 2A and the telescope loading section 20 fitted with the monocular telescope 42. A rotation stop recess 49 is also formed in the peripheral surface of the tube barrel in register with the rotation stop rib 27 formed on the upper half 3.

The eyepiece lens unit 50 is mounted in a rear portion of the tube barrel 43, so that, when rotated, the eyepiece lens unit 50 may be moved back and forth with respect to the tube barrel 43. The eyepiece lens unit 50 is comprised of an eyepiece lens barrel 52 threadedly mounted on a lead ring fitted on the rear opening of the tube barrel 43, an eyepiece lens unit 54 comprised of plural lenses built in the eyepiece lens barrel 52 with a spacer ring 53 interposed in-between, and an eyepiece lens cap 55 fitted on the opening end of an eyepiece lens barrel 52.

The above-described telescope-radio receiver assembly is assembled in the following manner.

Within a housing section 71, which is a radio receiving section housing section constituted in the lower half 4 constituting the casing 2, the printed circuit board 61, having the receiver circuit of the radio receiving section 2A constituted thereon, is mounted. The printed circuit board 61 is mounted at this time so that a display surface 64a of the display element 64 comprised of, for example, a liquid crystal display element constituting the display section 7, is directed upwards. The bar antenna 30 is mounted so as to be housed within the bar antenna holding section 7A formed along a front lateral surface 71a of the housing section 71, that is the front lateral surface 7 of the casing 2. When the printed circuit board 61 is housed within the housing section 71, the circuit board 61 and the external connection cord of the earphone 31 are electrically and mechanically connected to each other.

The monocular telescope 42 is mounted in the telescope loading section 20 provided within the casing 2, with the mounting piece 48 then being engaged in the mounting section 24. The object lens cap 45 is fitted on the objective lens side of the telescope 42, while the eyepiece lens cap 55 is mounted on the eyepiece lens side. The telescope 42, housed within the loading section 20, has its lens barrel portion supported by the arcuate rib The upper half 3 is assembled to the lower half 4, with the radio receiving unit 2A and the telescope 42 being then housed within the lower half 4. The lower half 4 is screwed onto the upper half 3 so that the rotation stop rib 27 formed on the inner surface of the upper half 3 is engaged with the rotation stop recess 49 for the telescope 42 provided on the lower half 4. By mounting the upper half 3 on the lower half 4, the lens caps 45, 55 are clamped by the upper and lower halves 3 and 4. The display element 64 constituting the display section 11 at this time faces the window 63 constituting the display section 11 formed on the upper half 3. The switches 62 on the printed circuit board 61 face the operating buttons, such as the one-touch button 12.

The bar antenna 30 may be mounted in the housing section of the radio receiving section 2A of the lower half 4 as a single component, instead of on the circuit board 61. The earphone cord takeup unit may be mounted on the lower half 4 at a stage prior to the stage of mounting the printed circuit board 61.

In the above-described monocular telescope 42, not only the lens barrel 43 and the objective lens cap 45 are molded of synthetic material, but the lead wire 51, eyepiece lens cap 52 and the spacer ring 53 are also molded of a synthetic resin mixed with glass fibers for increasing the mechanical strength. Of course, the eyepiece lens cap 55 is molded of rubber or elastomer.

The monocular telescope 42, substantially all of the components of which except the lenses and the prism are formed of synthetic resin, is decreased in weight significantly as compared to a similar product formed of metal. The monocular telescope 42, thus reduced in weight, is loaded in the telescope loading section 20 formed towards the right lateral surface of the casing 2. At this time, the telescope mounting portion 24 and the mounting piece 48 on the superposed partitioning walls 22 are screwed to each other, and the upper hand lower halves 3, 4 are combined together, with the rotation stop rib 27 on the upper half 3 then being fitted in the rotation stop recess 49 for fixedly combining the telescope in position within the casing 2.

The objective lens cap 45, loaded on the front opening part of the lens barrel 43, is held by being clamped by the objective lens cap attachment section 28, while the eyepiece lens cap 55, loaded on the rear opening, is held by being clamped by the eyepiece lens cap attachment section 29.

The present invention is not limited to the above-described telescope-radio receiver assembly. For example, by fitting the left-hand side surface of the casing 2 with a telescope loading section, constructed similarly to the telescope loading section 20 for the monocular telescope 42 fitted on the right side of the casing 2, and by loading a telescope on the left-hand side telescope loading section, a telescope-radio receiver assembly fitted with a binocular type telescope is completed, although the assembly thus constructed is increased to some extent in size. It is noted that the left-side and right-side telescopes are arranged so that both eyepiece lens units are adjusted in their movements in unison by a focusing adjustment mechanism as in the case of a conventional binocular.

Although the above-described telescope-radio receiver assembly 1 is fitted with the telescope loading section 20 on the right-hand lateral surface 9 of the casing 2 for loading the monocular telescope 42 for use by a right-handed user, the telescope loading section 20 may also be formed on the left-hand lateral surface 10 of the casing 2 for loading the monocular telescope 42 for use by a left-handed user.

With the telescope-radio receiver assembly according to the present invention, the radio receiving section 2A and the telescope 42 loaded in the telescope loading section 20 are completely isolated from each other, and the partitioning wall 22 therebetween is thermally isolated, so that ill effects of the heat evolved by the electrical and electronic components of the radio receiving section 2A to the telescope 42 loaded in the telescope loading section 20 may be eliminated and there is no inconvenience such as distortion caused to the lens barrel. If the radio receiving section 2A is of a drip-proof structure in order to maintain insulation against intrusion of rainwater, the telescope 20 arranged as an independent space may be maintained in properly ventilated state, so that there is no such inconvenience caused such as dewing produced in the lenses.

In addition, with the telescope-radio receiver assembly according to the present invention, the bar antenna 30 is housed and arranged in the bar antenna housing recess 7A formed for extending forwards from the front lateral surface of the casing 2 along the front lateral surface 7, so that there is no interference of electrical waves by the hand gripping the casing 2 or the telescope 42 arranged on the left-hand surface 9 and/or the right-hand surfaces 10, and hence good reception sensitivity may be achieved.

What is claimed is:

1. A telescope-radio receiver assembly comprising:

a casing made up of an upper half and a lower half as a substantially parallelepipedic hollow member, said casing being formed with a first housing section for extending along a first lateral surface thereof across two mutually opposite lateral surfaces extending at right angles to said first lateral surface;

a telescope unit housed within said first housing section, said telescope unit having at least a lens barrel formed of a synthetic material mixed with glass fibers, wherein said first housing section is tubular and has both its ends opened;

wherein said casing has a further housing section isolated from said first housing section and wherein a radio receiving section fitted with a bar antenna is housed within said further housing section; and wherein the bar antenna is arranged along one of said two mutually opposite lateral surfaces on which an objective lens of said telescope section is arrayed.

2. A telescope-radio receiver assembly comprising:

a casing made up of an upper half and a lower half as a substantially parallelepipedic hollow member, said casing being formed with a first housing section and a second housing section, said first housing section extending along a first lateral surface thereof across two mutually opposite lateral surfaces extending at right angles to said first lateral surface, said second housing section being formed for extending outward beyond the front one of the two lateral surfaces;

a telescope section housed within said first housing section, and a radio receiving unit housed within said second housing section, said radio receiving unit being fitted with a bar antenna and being housed within said second housing section so that the bar antenna is disposed for extending along the front side lateral surface of the second housing section, wherein said second housing section has a projecting portion formed by projecting one of the two mutually opposite lateral surfaces beyond an objective lens of the telescope unit, and wherein the bar antenna is disposed within said projecting portion.

3. The telescope-radio receiver assembly as claimed in claim 2 wherein said first housing section is tubular and has both its ends opened, and wherein said first and second housing sections are isolated from each other.

4. The telescope-radio receiver assembly as claimed in claim 3 further comprising heat insulating means between said first and second housing sections.

5. The telescope-radio receiver assembly as claimed in claim 2 further comprising rotation inhibiting means for inhibiting rotation of said telescope section, said rotation inhibiting means being an engagement projection provided in one of the telescope section and the first housing section and an engagement recess formed in the other of the telescope section and the first housing section.

6. The telescope-radio receiver assembly as claimed in claim 2 further comprising an earphone fed with output signals of the radio receiving unit and a takeup section for taking up an earphone cord for said earphone, said second housing section having a further housing section for also housing said earphone, said earphone being taken out from said further housing section.

7. A telescope-radio receiver assembly comprising:

a casing made up of an upper half and a lower half as a substantially parallelepipedic hollow member, said casing being formed with a first housing section for extending along a first lateral surface thereof across two mutually opposite lateral surfaces extending at right angles to said first lateral surface;

a telescope unit housed within said first housing section, said telescope unit having at least a lens barrel formed of a synthetic material mixed with glass fibers, wherein said first housing section is tubular and has both its ends opened;

wherein said casing has a further housing section isolated from said first housing section and wherein a radio receiving section fitted with a bar antenna is housed within said further housing section, wherein the bar antenna is arranged along one of said two mutually opposite lateral surfaces on which an objective lens of said telescope section is arrayed, and wherein said telescope unit is a monocular telescope and said lens barrel is tubular.

* * * * *